(12) United States Patent
De Peuter (10) Patent No.: US 11,449,685 B2
(45) Date of Patent: Sep. 20, 2022

(54) COMPLIANCE GRAPH GENERATION

(71) Applicant: INTUIT INC., Mountain View, CA (US)

(72) Inventor: Conrad De Peuter, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 341 days.

(21) Appl. No.: 16/704,801

(22) Filed: Dec. 5, 2019

(65) Prior Publication Data

US 2021/0174032 A1 Jun. 10, 2021

(51) Int. Cl.
| | |
|---|---|
| *G06F 40/45* | (2020.01) |
| *G06N 5/02* | (2006.01) |
| *G06N 20/00* | (2019.01) |
| *G06N 3/02* | (2006.01) |

(52) U.S. Cl.
CPC ............. *G06F 40/45* (2020.01); *G06N 5/02* (2013.01); *G06N 20/00* (2019.01); *G06N 3/02* (2013.01)

(58) Field of Classification Search
CPC ............ G06N 5/02; G06N 20/00; G06N 3/02; G06N 3/0445; G06N 3/0454; G06N 3/08
See application file for complete search history.

(56) References Cited

U.S. PATENT DOCUMENTS

| | | | |
|---|---|---|---|
| 10,521,508 B2 * | 12/2019 | Bateman | G06F 40/237 |
| 10,607,298 B1 | 3/2020 | Hanekamp, Jr. et al. | |
| 2007/0168228 A1 * | 7/2007 | Lawless | G16H 40/67 705/2 |
| 2017/0316513 A1 * | 11/2017 | Hubbard | G06Q 40/123 |
| 2020/0133952 A1 * | 4/2020 | Sheinin | G06N 3/0445 |

FOREIGN PATENT DOCUMENTS

WO  WO-2014040766 A1 *  3/2014  ............... G06F 8/51

OTHER PUBLICATIONS

Lee et al. "Translating building legislation into a computer-executable format for evaluating building permit requirements". Automation in Construction 71, (2016), pp. 49-61 (Year: 2016).*
Song et al. "Approach to capturing design requirements from the existing architectural documents using natural language processing technique". Proceedings of the 23rd International Conference of the Association for Computer-Aided Architectural Design Research in Asia (CAADRIA) 2018, vol. 2, 247-254 (Year: 2018).*
Juncys-Dowmunt et al. "Log-linear combinations of monolingual and bilingual neural machine translation models for automatic post-editing". arXiv:1605.04800v2. Jun. 23, 2016 (Year: 2016).*

* cited by examiner

*Primary Examiner* — Jesse S Pullias
(74) *Attorney, Agent, or Firm* — Patterson + Sheridan, LLP (57) ABSTRACT

Certain aspects of the present disclosure provide techniques for generating a compliance graph based on a compliance rule to implement in a software program product for determining user compliance. To generate a compliance graph, an encoder receives a compliance rule in a source language and generates a set of corresponding vectors. The decoder, which has been trained using verified training pairs and synthetic data, generates a sequence of operations based on the vectors from the encoder. The sequence of operations is the used to build a graph in which each operation is a node in the graph and each node is connected to at least one other node in the same graph or a separate graph.

20 Claims, 5 Drawing Sheets

FIG. 5

COMPLIANCE GRAPH GENERATION

INTRODUCTION

Aspects of the present disclosure relate to a method and system for generating a compliance graph, based on compliance rule(s) to implement for determining user compliance.

BACKGROUND

Governing authorities around the world have implemented various rules and regulations for compliance with certain standards in different industries and sectors. The compliance rules and regulations are directed towards, for example, calculating taxes and other financial information (e.g., federal and local taxes owed, number of dependents, amount of deductions, adjusted gross income, etc.), keeping personal identifying data (e.g., Social Security numbers Personal Identification Numbers, driver's license numbers, passport numbers, credit card information, etc.) and medical information (e.g., medical history of a patient, family medical history, prescriptions, etc.) private, etc.

In order to determine compliance with the standards established by governing authorities (e.g., for calculating financial information or maintaining privacy of personal data), people may utilize software program products constructed on a set of graphs (e.g., a set of compliance graphs). A compliance graph includes a set of nodes, such that each node represents operation(s) for the software program to perform in accordance to the compliance rules. Such nodes may also incorporate content that represents a knowledge domain.

For example, in a compliance graph regarding the domain of tax knowledge, a node can include content on how to calculate a tax value such as number of dependents or amount of deductions for a taxable year. Users can input information to the software program product and, based on the set of compliance graphs, determine whether the user is in compliance (or how the user can be in compliance). For example, a user can enter information (e.g., annual salary, number of dependents, amount of deductions, etc.) to a software program product for calculating tax returns. Based on the entered information, the software program product built on an underlying compliance graph can indicate to the user how much money the user owes (or how much the user is getting in return) for a particular tax year.

Conventional methods and systems for generating such compliance graphs are time consuming, resource intensive, and costly to employ. Further, in instances where a set of compliance graphs is developed for a particular domain, the use of that set of compliance graphs in a software program product is limited in use to the compliance rules at the time of generating the graphs. If the compliance rules are updated or new compliance rules are implemented, then a new set of compliance graphs will need to be generated. With the costs associated with generating the new and/or updated set of compliance graphs, many will be deterred from attempting to do so, and as a result, software program products will fail to provide adequate support for people determining compliance. In some cases, the software program products will be out of date or non-existent (such as when a new set of compliance rules are implemented for an industry).

As such, a solution is needed to generate graphs for determining compliance without monopolizing resources so as to develop a software program product capable of keeping up with changing compliance rules as well as with the ability to enter new industries and/or markets with few barriers to entry (e.g., cost, language, etc.).

BRIEF SUMMARY

Certain embodiments provide a method for generating a graph (e.g., a compliance graph). The method generally includes receiving one or more compliance rules in a source language. The method further includes generating, via a pre-trained Universal Language Model (ULM) encoder, a set of vectors corresponding to each compliance rule. The method further includes generating, via a trained decoder and based on the set of vectors, a sequence in a target language corresponding to each compliance rule, the sequence comprising a set of operations, wherein the decoder is trained with a set of verified training pairs of a type of source language and target language and a set of synthetic data generated based on the set of verified training pairs. The method further includes generating a compliance graph of each sequence in the target language by identifying each operation in the sequence, splitting the sequence based on each identified operation, and connecting each operation with at least one other operation.

Other embodiments provide systems configured to perform the aforementioned method to generate a graph, as well as non-transitory computer-readable storage mediums comprising instructions that, when executed by a processor of a computing system, causes the system to perform the aforementioned method to generate a graph.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for generating a compliance graph based on a compliance rule to implement in a software program product for determining user compliance.

In order to determine compliance with a set of rules and regulations, people and organizations (e.g., for-profit business, non-profit organizations, local and federal governments, etc.) often utilize a software program product developed for determining compliance. In such cases, the software program product incorporates a set of compliance graphs as the foundation for determining compliance with a set of rules and regulations. Each compliance graph is made of a set of nodes that embody a particular compliance rule. Further, each node is encoded with a set of operations associated with the compliance rule. The nodes and compliance graphs are connected together by references within a node to another operation in another node (e.g., within a compliance graph or with another compliance graph). The connected compliance graphs represent the compliance rule(s).

In one embodiment, a compliance graph engine generates a compliance graph. The compliance graph engine includes an encoder, a decoder, and a graph generator. The compliance graph engine receives a compliance rule in a source language. The compliance rule is input to the encoder, which in turn generates a set of vectors that corresponds to the compliance rule. In some cases, the encoder is a pre-trained Universal Language Model such as a Bidirectional Encoder Representation from Transformers (BERT), ELMo, or ULMFiT. Once the set of vectors is generated, the set of vectors are input to the decoder to generate the compliance rule in a target language, such as a set of operations and operands representing the compliance rule. For example, the compliance rule in the source language may be "Enter the smaller of line 3 and line 4." After processing by the encoder and decoder, the compliance graph engine can generate the compliance rule in the target language as "Minimum_Line3_Line4."

The decoder that generates the compliance rule in the target language is trained by a combination of verified training pairs and synthetic data. In some cases, the compliance graph engine trains the decoder prior to implementing the decoder. To train the decoder, a set of verified training pairs are utilized. A training pair includes a compliance rule in the target language and source language. For example, ("Enter the greater of lines 20 and 24, subtracted from line 8", "Maximum_Line20_Line24_Difference_Line8_<TEMP>") is an example of training pair. The training pairs are verified by a human associated with the compliance graph engine. In addition to the verified training pairs, the decoder is trained based on synthetic data. The decoder is trained using both verified training pairs and synthetic data because training entails a large amount of training data and verifying training pairs is a resource intensive process. As such, synthetic data is generated based on the verified training pairs so the synthetic data has the same level of confidence as the verified training pairs and is not as resource intensive. With both the verified training pairs and the synthetic data, the decoder is trained and implemented in less time and cost than if the decoder was trained only on the verified training pairs. Further, the compliance graph engine can continue to train the decoder after implementation with additional training data.

The trained decoder of the compliance graph engine receives the vector(s) representing the compliance rule and generates the compliance rule in a target language such as a sequence of operations and operands. The compliance graph engine then generates a compliance graph based on the compliance rule in the target language (e.g., a set of operations and operands) by a graph generator. The graph generator identifies each operation in a sequence and separates out of the sequence each operation and corresponding operands. To build the compliance graph, the graph generator links each operation in a sequence to another operation within the sequence. Further, to connect compliance rules and for a set of compliance graphs, the graph generator links an operation from one compliance graph to another operation in another compliance graph based on a reference in the operation to the other.

Once the compliance graph engine generates a set of compliance graphs, the set of compliance graphs can be implemented as part of a software program product. Further, with the compliance graph engine, a set of compliance graphs can be generated regardless of type of source language, which in turn allows for the software product to be implemented in more instances as previous barriers to entry (e.g., language, costs, etc.) are eliminated. For example, a compliance graph engine with a decoder trained on training data of United States tax code can be implemented to generate a set of compliance graphs for any type of tax code input to the compliance graph engine, such as Canadian tax code, French tax code, and Greek tax code. As such, the set of generated compliance graphs can be the basis of a software program product for users trying to determine compliance.

Example System for Generating a Graph

Figure 1:
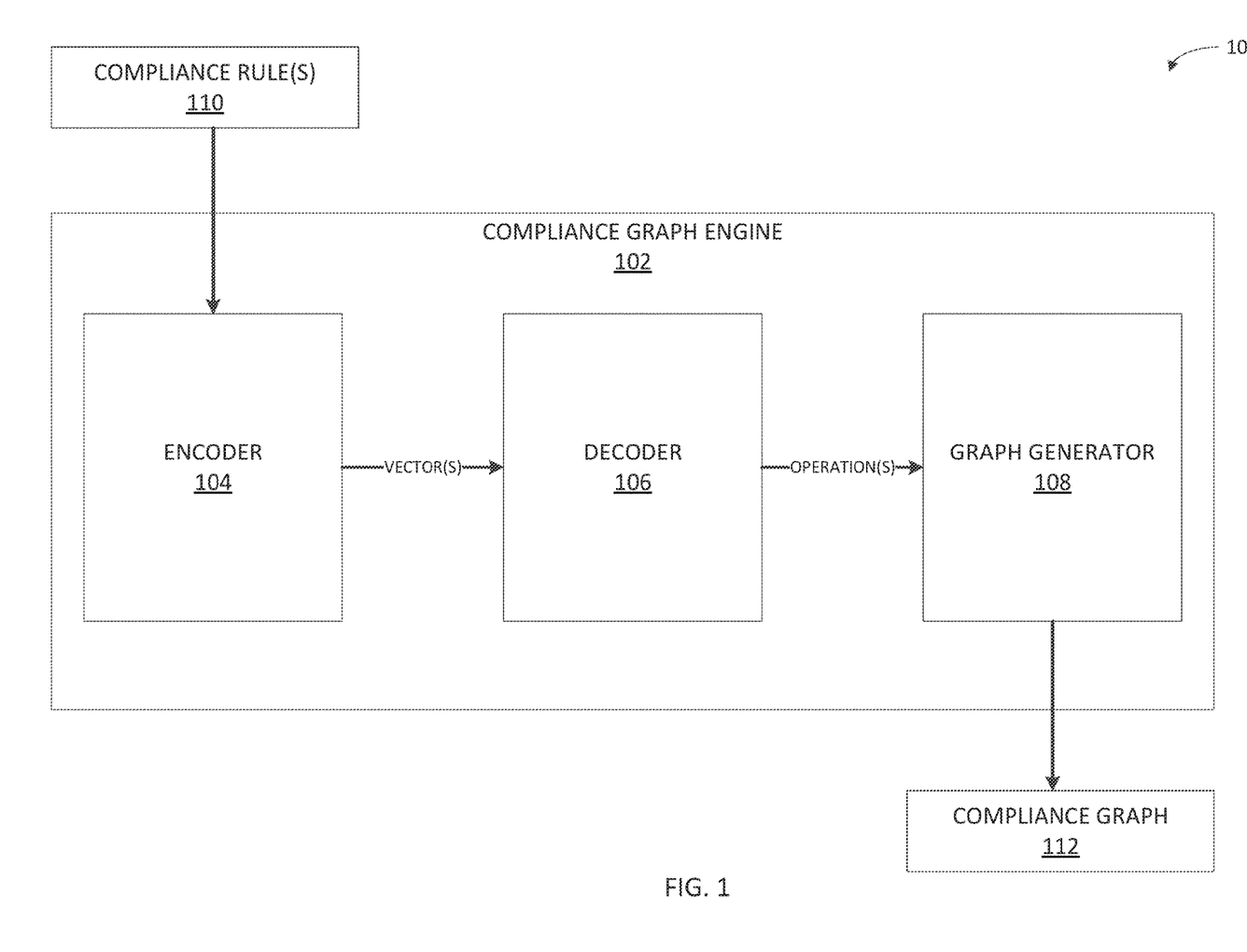
FIG. 1 depicts an example system for generating a graph based on a compliance rule according to an embodiment.

FIG. 1 depicts an example system 100 for generating a graph representing a compliance rule. The example system 100 includes a compliance graph engine 102. The compliance graph engine 102 includes an encoder 104, a decoder 106, and a graph generator 108.

The compliance graph engine 102 receives compliance rule(s) 110. The compliance rule 110 is in a type of source language. The compliance rule 110 can be from a governing authority and related to a specific knowledge domain, such as tax, medicine, data protection, etc. The compliance rule 110 is a rule or regulation for a user to adhere to in a particular knowledge domain. In one example, the compliance rule(s) 110 can be in the knowledge domain for taxes and pertain to the calculation of values, such as deduction amounts, number of dependents, etc. In another example, the compliance rule(s) 110 can pertain to the knowledge domain of medical information and protection of such information according to the compliance rules (e.g., where the information is collected from, how the information is stored, etc.). The source language can be a language based on the Latin alphabet, such as English, French, Italian, etc., or the source language be a language based on a non-Latin alphabet, such as Russian, Greek, Hindi, Korean, etc.

The encoder 104 receives the compliance rule 110 as an input. The encoder 104 is a trained Universal Language Model (ULM). In some cases, the encoder 104 can include a Bidirectional Encoder Representations from Transformers (BERT), ELMo, and ULMFiT. The encoder 104 generates, based on the compliance rule 110 input, a set of vectors representing the compliance rule 110. The encoder 104 can include weights that can be adjusted during training. In some cases, the encoder 104 includes pre-trained weights. As such, when using the compliance graph engine 102, a flag can be set to either continue back-propagation into the encoder 104 to adjust the weights. In other cases, pre-trained weights can be frozen during use of the compliance graph engine 102.

After the set of vectors are generated by the encoder 104, the set of vectors are input to the decoder 106. In some cases, the decoder 106 is a Recurrent Neural Network (RNN). In other cases, the decoder 106 is a RNN with attention. The decoder 106 is trained, for example, by the compliance graph engine 102, using training data, such as verified pairing data and synthetic data generated based on the verified pairing data.

To train the decoder 106, both the verified pairing data and the synthetic data include a compliance rule in the source language and corresponding target language. In some cases, the training data can include more than one type of source language, such as English, French, Greek, Korean, etc. The training data trains the decoder 106 to generate a compliance rule in a target language based on the source language. Once the decoder 106 is trained and implemented in the compliance graph engine 102, the decoder 106 can take the vectors representing the compliance rule 110 as input and generate the compliance rule 110 in the target language (e.g., a sequence of a set of operations and operands). In some cases, when the decoder 106 is generating the compliance rule as a set of operations and operands (e.g., the target language), the decoder 106 retrieves one vector at a time until the decoder 106 reaches a vector and/or token representing the end of the compliance rule. In some cases, the decoder 106 can include weights that can be adjusted during training. In some cases, the decoder's 106 weights are initialized randomly prior to adjustment of weights during training.

In order to generate the compliance graph representing the compliance rule in the target language, the graph generator 108 of the compliance graph engine 102 receives the sequence of operation(s) and operand(s) representing the compliance rule in the target language. The graph generator 108 identifies each operation and operand in the sequence. Each operation in a sequence represents a node. In some cases, the decoder 106 stores the operations in a stack data structure. Upon identifying each node, the graph generator 108 splits the sequence, separating each operation with its corresponding operands. The graph generator 108 then links together each operation (e.g., node) with another operation to generate a compliance graph 112. For example, the graph generator 108 can retrieve a referenced operation by accessing the previously stacked operation in the stack data structure.

In some cases, the compliance graph 112 includes only one operation. In such cases, the operation (e.g., node) of the single-operation compliance graph is connected to another compliance graph 112 that includes at least one operation with reference to the single operation compliance graph. In other cases, the compliance graph 112 includes a set of operations. In such cases, each operation is connected to at least one other operation by a reference in one operation to another operation. Further, in such cases, at least one operation of the set of operations can be connected to another operation in another compliance graph 112 by a reference in one operation to the other operation.

In some cases, upon linking operations together to create a set of compliance graphs, the compliance graphs can be implemented as part of a software program product to determine user compliance with the rules. For example, as part of the software program product, the user can provide information that can be input to one or more compliance graphs, and each node of that encompasses an operation can be used to determine compliance by the user.

Examples of a Graph Generated from a Compliance Rule

Figure 2A:
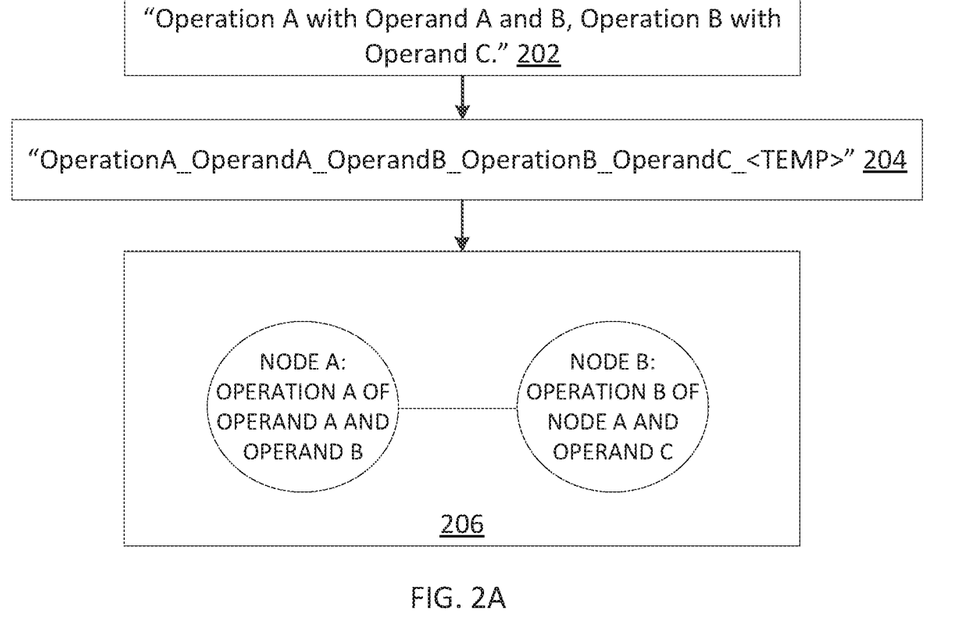
FIG. 2A-2B depict example graphs generated based on a compliance rule according to an embodiment.
Figure 2B:
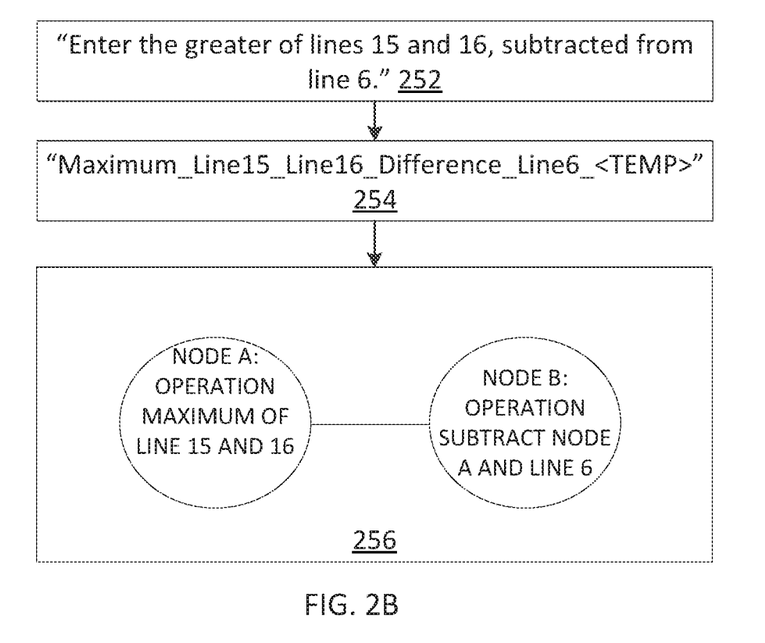

FIGS. 2A-2B depicts examples of a graph generated from a compliance rule. In FIG. 2A, the compliance rule is depicted in a source language at 202, such as "Operation A with Operand A and B, Operation B with Operand C." The compliance rule in the source language at 202 is received by the compliance graph engine, and based on the encoder and decoder, the compliance rule is generated in the target language by the compliance graph engine. For example, based on the compliance rule in the source language at 202, the compliance graph engine can generate the compliance rule in the target language. For example, the compliance rule in the target language can be a sequence of operations and operands, such as "OperationA_OperandA_OperandB_ OperationB_OperandC_<TEMP>." The compliance rule at 204 represents a compliance rule in the target language. Additionally, the compliance rule in the target language at 204 also includes a reference in one operation to another operation (e.g., "<TEMP>"). In some cases, the reference is to another operation in the stack data structure storing the operations generated by a decoder.

After the compliance rule is generated in the target language at 204, the compliance graph engine generates a compliance graph of the compliance rule at 206. The compliance graph engine generates the compliance graph by identifying each operation in the sequence representing the compliance rule in a target language. The graph generator of the compliance graph engine then splits the sequence by separating the operations and linking an operation to at least one other operation. The operation represents a node in the compliance graph. The nodes of the compliance graph are connected to at least one other node (e.g., either in the same compliance graph or a separate compliance graph). In FIG. 2A, the "<TEMP>" reference illustrated at 204 is a reference in the operation to link to another operation (e.g., the previous operation). As such, the compliance graph at 206 includes a reference in Node B to Node A that links the two nodes together.

Similar to FIG. 2A, FIG. 2B illustrates one example of a compliance rule in a source language at 252 that states "Enter the greater of lines 15 and 16, subtracted from line 6." Based on a compliance rule in the source language at 252, the compliance graph engine generates the compliance rule in the target language at 254 as "Maximum_Line15_ Line16_Difference_Line6_<TEMP>." Further, the compliance graph engine generates a compliance graph of the compliance rule as illustrated at 256 such that Node B which includes the reference "<TEMP>" in the target language is connected to Node A.

While FIGS. 2A-2B illustrate the compliance rule in a source language that is a Latin based alphabet with two operations (e.g., nodes), the compliance rule can be in a non-Latin based alphabet source language with more or less than two operations.

Example a Method for Training a Decoder in a System to Generate a Graph

Figure 3:
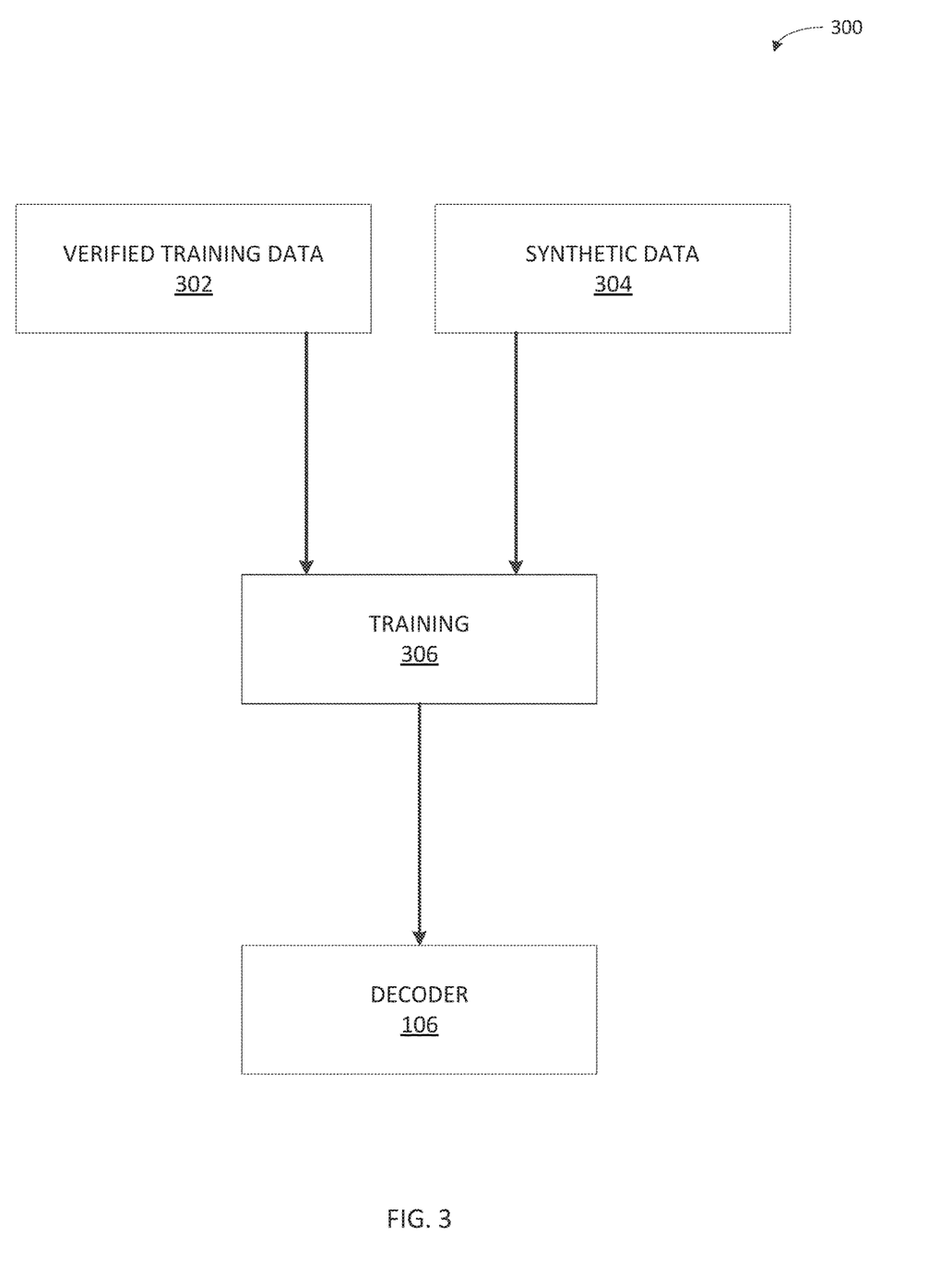
FIG. 3 depicts an example flow diagram of training a decoder in a compliance graph engine for generating a graph according to an embodiment.

FIG. 3 depicts an example method 300 for training a decoder in a compliance graph engine to generate a compliance rule in a target language. In some cases, the decoder 106 is an RNN, RNN with attention, etc. The decoder 106 is trained using a set of training data that includes a set of verified training data 302 and synthetic data 304. The set of verified training data 302 includes verified training pairs, each of which include a compliance rule in a type of source language and a target language. The verified training data 302 is verified by a human knowledgeable of the compliance graph engine. The synthetic data is generated based on the verified training data, for example, to ensure the synthetic data 304 has the same confidence level as the verified training data 302 when training the decoder 106.

The process of verifying training data is costly and time-consuming, so in order to efficiently use resources that are available, synthetic data 304 is generated. For example, the compliance graph engine can generate synthetic data based on the verified training data 302 received from a human associated with the compliance graph engine so that further human verification is not necessary. The synthetic data 304 can include pairings similar to those of the verified training data. With the synthetic data 304 generated, the decoder 106 can be trained at 306 more efficiently and implemented in the computer graph engine with the verified training data 302 to generate a compliance rule in a target language.

Example Method for Generating a Graph

Figure 4:
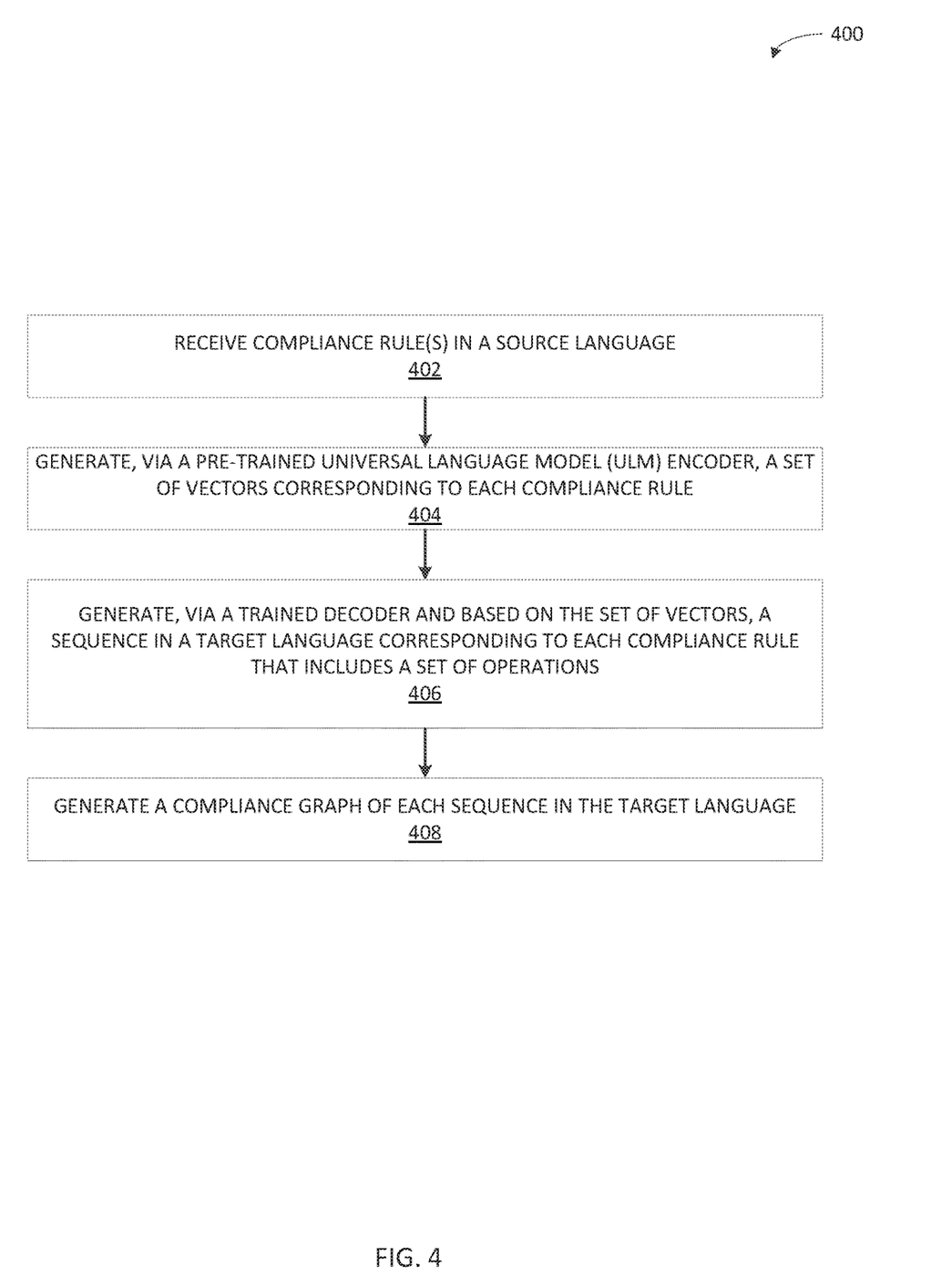
FIG. 4 depicts an example flow diagram of a method for generating a graph based on a compliance rule according to an embodiment.

FIG. 4 depicts an example method 400 for generating a graph based on a compliance rule, as described with respect to FIGS. 1-3.

At 402, a compliance graph engine receives compliance rule(s) in a source language. In some cases, the source language is based on the Latin alphabet (e.g., English, French, Spanish, etc.). In other cases, the source language is based on a non-Latin alphabet (e.g., Greek, Hebrew, Chinese, Japanese, etc.). Further, a compliance rule can be a new rule or an update to an existing rule from a governing authority.

At 404, a compliance graph engine generates, via a trained ULM encoder, a set of vectors corresponding to each compliance rule. The encoder of the compliance graph engine is pre-trained and can include, for example, a Bidirectional Encoder Representations from Transformers (BERT), ELMo, and ULMFiT. Upon receiving a compliance rule as input, the encoder generates a set of vectors that corresponds to the compliance rule.

At 406, a compliance graph engine generates a sequence in a target language. For example, the decoder of the compliance graph engine generates a list of words in the target language such that each word corresponds to a vector generated by the encoder. In some cases, the target language can include a set of operations and operands, representing the compliance rule. The decoder can generate the sequence by taking one vector at a time and translating the vector to the target language until the decoder reaches a vector and/or token representing the end of the compliance rule.

In order for the decoder to generate the sequence, representing the compliance rule, in the target language, the decoder is trained prior to implementation in the compliance graph engine. For example, the decoder is trained on a set of verified training pairs of compliance rules in a source language and a target language. The set of training pairs are verified by an authorized user associated with the engine. Additionally, the set of training pairs can include more than one type of source and target language pairings. For example, the training pairs can include compliance rules in English, French, Russian, etc., as the source language and a verified translation of the compliance rule to a target language. In some cases, the target language can be any language that can be represented as a sequence of tokens.

Further, the decoder is trained using synthetic data generated by the compliance graph engine. The synthetic data is generated based on the verified set of training pairs in order to train the decoder without having to expend a large amount of resources (e.g., time, money, etc.). Verifying enough training pairs can be resource intensive, and generating synthetic data based on the verified training pairs is less resource intense. For example, with a small set of verified training pairs, the compliance graph engine can generate a much larger set of training pairs (e.g., synthetic data) that can train the decoder with the same level of confidence as the verified training pairs. In some cases, verification of a training pair is received from a user by the compliance graph engine, and a confidence level is determined and associated with the training pair. Based on the verified training pair, synthetic data can be generated by the compliance graph engine that has the same confidence level as the verified training pair.

At 408, the compliance graph engine generates a compliance graph for each sequence in the target language. The compliance graph engine identifies each operation and operand in a sequence. Each operation in a sequence represents a node in the graph. Based on the operation(s) that are identified, the compliance graph engine splits the sequence in the target language and connects together each operation to at least one other operation (e.g., either in the same compliance graph or with another compliance graph).

In some cases, the sequence includes two or more operations (e.g., nodes). In such cases, the compliance graph engine generates the compliance graph by linking each operation to at least one other operation in the sequence based on a reference in an operation. For example, if a sequence has two operations, one operation has a reference to the other operation. As such, the compliance graph engine can link the two operations together based on the reference in order to generate the compliance graph.

In some cases, the sequence includes only one operation. In such cases, the compliance graph engine can generate a compliance graph for the one operation. Further, the compliance graph engine can link the compliance graph with one operation (e.g., a single node) to another compliance graph (e.g., previously or concurrently generated) based on a reference to an operation in either graph.

In some cases, regardless of the number of operations in a compliance graph, each compliance graph generated for each compliance rule is connected to another compliance graph. For example, if the compliance engine receives compliance rule(s), each compliance graph generated for each rule is connected (e.g., to a previously or concurrently generated compliance graph) to form a new compliance graph in the target language for the source language. As another example, if the compliance rule is an update to an existing compliance rule, then the compliance graph generated for the updated compliance rule replaces the compliance graph representing the previous version of the compliance rule and any links to other compliance graphs are transferred to the new compliance graph.

Once the compliance graph(s) are generated and connected to another compliance graph(s) according to references within operations, the set of compliance graphs can be implemented by the organization such that users can determine whether or not they are in compliance with rules. For example, a set of compliance graphs representing tax code can be implemented by an organization as part of a software program product to determine tax related values in accordance with the compliance rules, such gross income, adjusted gross income, number of dependents, federal tax return, etc.

Further, the organization can implement a software program product that includes the set of compliance graphs connected with a set of completeness graphs to determine whether the user has provided all of the values for determining compliance. For example, a user can request to find out how much state tax the user owes based on the values previously entered (e.g., to the software program product).

The software program product with both the set of compliance graphs and set of completeness graphs can determine, for example, that the user has failed to provide a value that would allow the set of compliance graphs to accurately calculate the state tax. The software program product in such an example can prompt the user for the value and then proceed to calculate the value of the state taxes owed in accordance to the compliance rules represented by the set of compliance graphs.

To make the determination of missing or incorrect information as well as prompt users for more information, the software program product utilizes a knowledge engine that relies on the set of compliance graphs and the set of completeness graphs (e.g., knowledge representations) as well advanced artificial intelligence algorithms. As part of the knowledge representations, the set of compliance graphs implemented with the set of completeness graphs in a knowledge engine indicate which information provided by the user is incorrect or what information is necessary.

For example, if a user seeking to calculate the amount of state taxes owed but failed to enter the correct annual income for the head of the household, then the software program via the completeness graph of the knowledge engine can indicate that information has been provided and via the compliance graph of the knowledge engine can indicate that the information provided is incorrect. As a result, the knowledge engine can prompt the user to provide the correct annual income amount (e.g., via a user interface). The software program product via the knowledge engine reviews the knowledge representations (e.g., the set of compliance graphs and the set of completeness graphs), and based on the interconnection between the two types of graphs and information in the knowledge representations, determines the incorrect information needs to be corrected by the user (or missing information provided by the user).

Example Server for Generating a Graph

Figure 5:
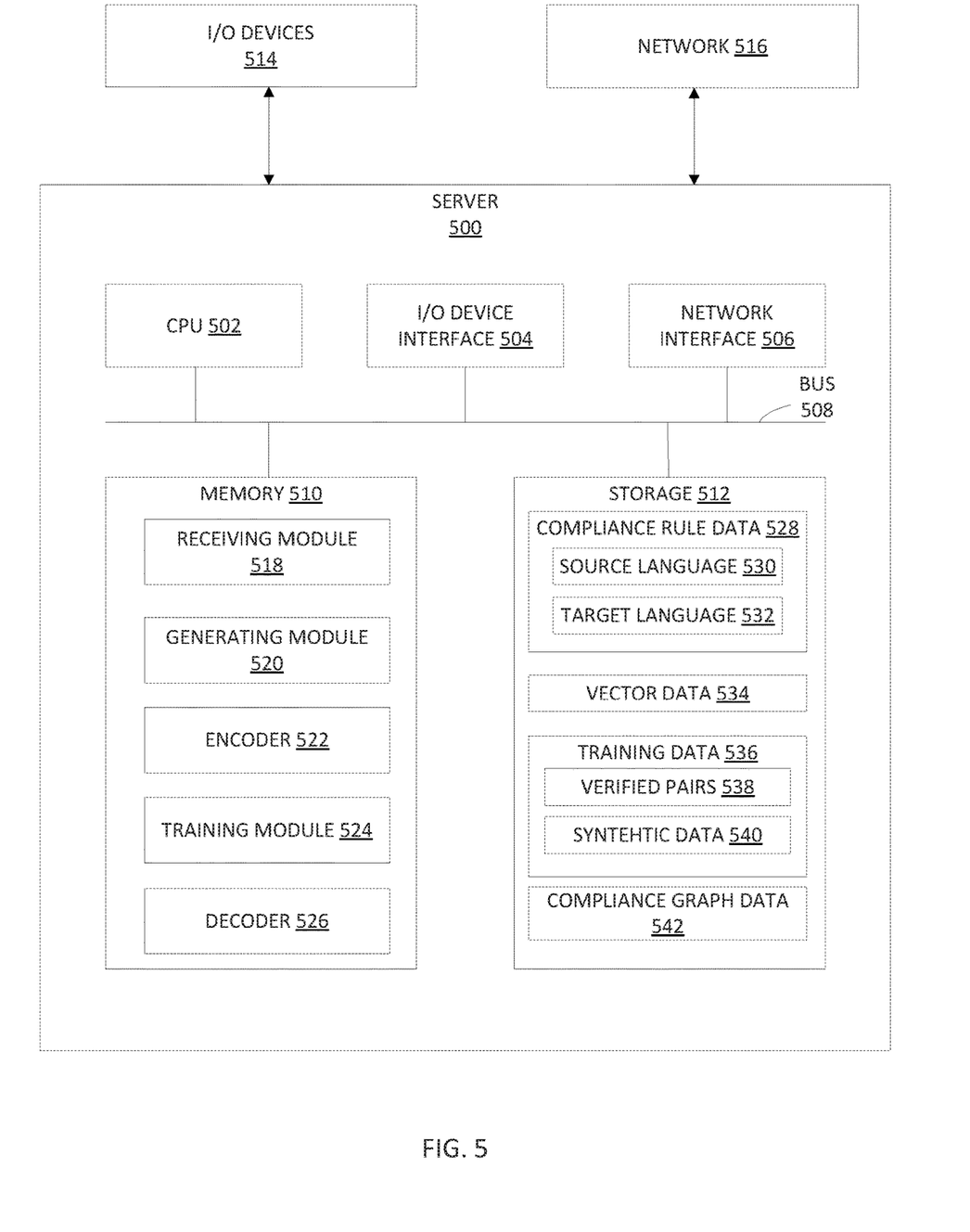
FIG. 5 depicts an example server for generating a graph based on a compliance rule according to an embodiment.

FIG. 5 depicts an example server 500 in a compliance graph engine that may perform methods described herein, such as the method for generating a graph as described with respect to FIGS. 1-4.

Server 500 includes a central processing unit (CPU) 502 connected to a data bus 508. CPU 502 is configured to process computer-executable instructions, e.g., stored in memory 510 or storage 512, and to cause the server 500 to perform methods described herein, for example, with respect to FIGS. 1-4. CPU 502 is included to be representative of a single CPU, multiple CPUs, a single CPU having multiple processing cores, and other forms of processing architecture capable of executing computer-executable instructions.

Server 500 further includes input/output (I/O) devices 514 and interfaces 504, which allows server 500 to interface with I/O devices 514, such as, for example, keyboards, displays, mouse devices, pen input, and other devices that allow for interface with server 500. Note that server 500 may connect with external I/O devices through physical and wireless connections (e.g., an external display device).

Server 500 further includes network interfaces 506, which provide server 500 with access to external network 516 and thereby external computing devices.

Server 500 further includes memory 510, which in this example includes a receiving module 518, a generating module 520, an encoder 522, a training module 524, and a decoder 526 for performing operations described in FIGS. 1-4.

Note that while shown as a single memory 510 in FIG. 5 for simplicity, the various aspects stored in memory 510 may be stored in different physical memories, but all accessible by CPU 502 via internal data connections such as bus 508.

Storage 512 further includes compliance rule data 528, which may be like the compliance rules received by the compliance graph engine in the source language 530 or the compliance rule generated in the target language 532, as described in FIGS. 1-4.

Storage 512 further includes vector data 534, which may be like the vector data generated by the encoder of the compliance graph engine, as described in FIGS. 1-2, 4.

Storage 512 further includes training data 536 (e.g., verified pairs 538 and synthetic data 540), which may be like the training data for training the decoder, as described in FIGS. 1-4.

Storage 512 further includes compliance graph data 542, which may be like the compliance graph generated by the compliance graph engine based on the compliance rule in the target language, as described in FIGS. 1-2, 4.

While not depicted in FIG. 5, other aspects may be included in storage 512.

As with memory 510, a single storage 512 is depicted in FIG. 5 for simplicity, but various aspects stored in storage 512 may be stored in different physical storages, but all accessible by CPU 502 via internal data connections, such as bus 508, or external connection, such as network interfaces 506. One of skill in the art will appreciate that one or more elements of server 500 may be located remotely and accessed via a network 516.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving one or more compliance rules in a source language;

generating, via a pre-trained Universal Language Model (ULM) encoder, a set of vectors corresponding to each of the one or more compliance rules;
receiving verification of a training pair in a set of training pairs of a type of source language and target language;
determining a confidence level associated with the verified training pair;
generating synthetic data with a same confidence level as the confidence level associated with the verified training pair;
generating, via a trained decoder and based on the set of vectors, a sequence in a target language corresponding to each of the one or more compliance rules, the sequence comprising a set of operations, wherein the trained decoder is trained with a set of verified training pairs of a type of source language and target language and a set of synthetic data including the generated synthetic data; and
generating a compliance graph of each sequence in the target language by:
identifying each operation in the sequence;
splitting the sequence based on each identified operation; and
connecting each operation with at least one other operation.

2. The method of claim 1, wherein the source language of the compliance rule and the target language of the sequence is the same as the type of source language and target language that trained the decoder.

3. The method of claim 1, wherein the source language of the compliance rule and the target language of the sequence is different than the type of source language and target language that trained the decoder.

4. The method of claim 1, wherein the set of verified training pairs includes more than one type of source language and target language.

5. The method of claim 1, wherein a compliance graph with two or more operations is generated for a sequence by linking one operation to at least one other operation based on a reference to the other operation.

6. The method of claim 1, wherein a compliance graph with one operation is generated for a sequence and is connected to another compliance graph based on a reference to the one operation.

7. The method of claim 1, wherein each generated compliance graph is connected to at least one other generated compliance graph based on a reference in one compliance graph to another operation in another compliance graph.

8. The method of claim 1, wherein each operation in the sequence is a node in the compliance graph.

9. A system, comprising:
a memory having executable instructions stored thereon; and
a processor configured to execute the executable instructions to cause the system to:
receive one or more compliance rules in a source language;
generate, via a pre-trained Universal Language Model (ULM) encoder, a set of vectors corresponding to each of the one or more compliance rules;
receive verification of a training pair in a set of training pairs of a type of source language and target language;
determine a confidence level associated with the verified training pair;
generate synthetic data with a same confidence level as the confidence level associated with the verified training pair;
generate, via a trained decoder and based on the set of vectors, a sequence in a target language corresponding to each of the one or more compliance rules, the sequence comprising a set of operations, wherein the trained decoder is trained with a set of verified training pairs of a type of source language and target language and a set of synthetic data including the generated synthetic data; and
generate a compliance graph of each sequence in the target language, wherein in order to generate the compliance graph, the processor is configured to cause the system to:
identify each operation in the sequence;
split the sequence based on each identified operation; and
connect each operation with at least one other operation.

10. The system of claim 9, wherein the source language of the compliance rule and the target language of the sequence is the same as the type of source language and target language that trained the decoder.

11. The system of claim 9, wherein the source language of the compliance rule and the target language of the sequence is different than the type of source language and target language that trained the decoder.

12. The system of claim 9, wherein a compliance graph with two or more operations is generated for a sequence by linking one operation to at least one other operation based on a reference to the other operation.

13. The system of claim 9, wherein a compliance graph with one operation is generated for a sequence and is connected to another compliance graph based on a reference to the one operation.

14. The system of claim 9, wherein each generated compliance graph is connected to at least one other generated compliance graph based on a reference in one compliance graph to another operation in another compliance graph.

15. A method, comprising:
receiving one or more compliance rules in a source language;
generating, via a pre-trained Universal Language Model (ULM) encoder, a set of vectors corresponding to each of the one or more compliance rule;
receiving verification of a set of training pairs of a type of source language and target language;
determining a confidence level associated with the verified set of training pairs;
generating synthetic data with a same confidence level as the confidence level associated with the verified set of training pairs;
generating, via a trained decoder and based on the set of vectors, a sequence in a target language corresponding to each of the one or more compliance rule, the sequence comprising a set of operations, wherein the trained decoder is trained with:
the verified set of training pairs; and
the generated synthetic data; and
generating a compliance graph of each sequence in the target language by:
identifying each operation in the sequence;
splitting the sequence based on each identified operation; and connecting each operation with at least one other operation.

16. The method of claim 15, wherein the method further comprises implementing the compliance graph with a completeness graph in a knowledge engine.

17. The method of claim 15, wherein a compliance graph with two or more operations is generated for a sequence by linking one operation to at least one other operation based on a reference to the other operation.

18. The method of claim 15, wherein a compliance graph with one operation is generated for a sequence and is connected to another compliance graph based on a reference to the one operation.

19. The method of claim 15, wherein each generated compliance graph is connected to at least one other generated compliance graph based on a reference in one compliance graph to another operation in another compliance graph.

20. The method of claim 15, wherein each operation in the sequence is a node in the compliance graph.

* * * * *